(12) United States Patent
Zeng

(10) Patent No.: US 10,234,623 B2
(45) Date of Patent: Mar. 19, 2019

(54) BACKLIGHT MODULE AND BACKLIGHT SOURCE AND PLASTIC FRAME THEREOF

(71) Applicant: Wuhan China Star Optoelectronics Technology Co., Ltd., Wuhan, Hubei (CN)

(72) Inventor: Jie Zeng, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 101 days.

(21) Appl. No.: 15/327,979

(22) PCT Filed: Dec. 27, 2016

(86) PCT No.: PCT/CN2016/112441
§ 371 (c)(1),
(2) Date: Jan. 20, 2017

(87) PCT Pub. No.: WO2018/119688
PCT Pub. Date: Jul. 5, 2018

(65) Prior Publication Data
US 2018/0210142 A1    Jul. 26, 2018

(30) Foreign Application Priority Data

Dec. 26, 2016 (CN) .......................... 2016 1 1218534

(51) Int. Cl.
*F21V 8/00* (2006.01)

(52) U.S. Cl.
CPC .......... *G02B 6/0088* (2013.01); *G02B 6/009* (2013.01); *G02B 6/0055* (2013.01); *G02B 6/0083* (2013.01)

(58) Field of Classification Search
CPC .. G02B 6/0088; G02B 6/0055; G02B 6/0083; G02B 6/009
See application file for complete search history.

(56) References Cited

U.S. PATENT DOCUMENTS

| | | | | |
|---|---|---|---|---|
| 2009/0196019 A1* | 8/2009 | Hsiao | ................ | G02F 1/133608 362/97.2 |
| 2013/0336003 A1* | 12/2013 | Yang | ........................ | G02B 6/42 362/608 |

(Continued)

FOREIGN PATENT DOCUMENTS

| | | |
|---|---|---|
| CN | 102628583 A | 8/2012 |
| CN | 103032837 A | 4/2013 |

(Continued)

*Primary Examiner* — Mary Ellen Bowman
(74) *Attorney, Agent, or Firm* — Andrew C. Cheng

(57) ABSTRACT

The present disclosure proposes a backlight source of a backlight module. The backlight source includes: one or more strip-shaped source carrier, comprising a plurality of holes arranged on a light emitting surface; the source carrier combined with the plastic frame; the source carrier and the plastic frame enclosing a rectangular frame; a PCB, arranged on the source carrier; and a source, corresponding to the hole and arranged on the source carrier; the source connected to the printed circuit board and transmitting light into the backlight module from the hole. The combination of the plastic frame and the backlight source realizes the respective functions of the conventional plastic frame and the conventional backlight source. Owing to the simplified plastic frame and backlight source, the bezel of the display can be narrower and smaller to satisfy the demands for the display with a narrow bezel.

6 Claims, 4 Drawing Sheets

(56) References Cited

U.S. PATENT DOCUMENTS

| | | | | |
|---|---|---|---|---|
| 2014/0111975 A1* | 4/2014 | Wu | ............... | G02B 6/0045 362/97.1 |
| 2016/0131827 A1* | 5/2016 | Lee | ............... | G02B 6/0088 349/58 |
| 2017/0192148 A1* | 7/2017 | Shang | ............... | G02B 6/009 |

FOREIGN PATENT DOCUMENTS

| | | |
|---|---|---|
| CN | 202902025 U | 4/2013 |
| CN | 105182607 A | 12/2015 |
| CN | 205539841 U | 8/2016 |
| KR | 20160034456 A | 3/2016 |

\* cited by examiner

BACKLIGHT MODULE AND BACKLIGHT SOURCE AND PLASTIC FRAME THEREOF

BACKGROUND

1. Field of the Disclosure

The present disclosure relates to the field of the liquid crystal display (LCD) technique, and more particularly, to a new backlight module structure.

2. Description of the Related Art

An LCD panel has been widely applied to a variety of electronic products.

A backlight module is one of the key components for the LCD panel. The liquid crystal does not illuminate itself. The function of the backlight module is to supply the LCD panel with sufficient brightness and well distributed light source with which the LCD panel shows images normally. A light source, a lampshade, a reflector, a light guide plate, a diffusion sheet, a brightness enhancement film, a plastic frame, and other components are assembled, and the backlight module is formed.

As FIG. 1 shows, a conventional backlight module 800 includes a plastic frame 81, a reflector 82, a light guide plate 83, an optical film set 84, a source printed circuit board (PCB) 85, and a plurality of lighting sources 86 arranged in the source PCB 85. The source PCB 85 is a hollow rectangular frame. The plurality of lighting sources 86 are formed by a plurality of light emitting diodes (LEDs) mounted on a welding plate. Further, the plurality of lighting sources 86 are fixed on the plastic frame 81 via a double-sided glue 87. The plurality of lighting sources 86 need to be arranged sequentially on the plastic frame 81. Specifically, the step of arranging the plurality of lighting sources 86 includes: At first, the source PCB 85 including the plurality of lighting sources 86 is inverted and arranged on the area between one side of the plastic frame 81 and the light guide plate 83. Next, the source PCB 85 is fixed on the side of the plastic frame 81 and the surface of the side of the light guide plate 83 via the double-sided glue 87. At last, the optical film set 84 and the remaining components are fixed. In this way, the plurality of lighting sources 86 on the source PCB 85 illuminate the light toward the light guide plate 83.

However, after the backlight module is assembled completely, a test is required. When one of the components in the backlight module is found faulty in the test, a detailed test is required to detect if other components are faulty. But, since the backlight module is designed as integration and the PCB 85 is fixed on the plastic frame 81 and the light guide plate 83, it is inevitable to take the backlight module apart to check the backlight module thoroughly, to replace the faulty components, and to assemble the backlight module again. Obviously, the efficiency is extremely low. It is also possible that the normal components are damaged. It not only takes a lot of time to examine or assemble the conventional structure but also costs a lot of labor power.

It is urgent to search for a new backlight module structure.

SUMMARY

An object of the present disclosure is to propose a backlight module and a backlight source of the backlight module to simplify the production of the backlight module, to reduce the cost, and to satisfy the demands for the narrow bezel of the backlight module, which are the problems of the related art.

According to the present disclosure, a backlight source of a backlight module configured to form a structure of the backlight module with a plastic frame combined with the backlight source is provided. The backlight source includes:

one or more strip-shaped source carrier, comprising a plurality of holes arranged on a light emitting surface; the source carrier combined with the plastic frame; the source carrier and the plastic frame enclosing a rectangular frame; and a printed circuit board (PCB), arranged on the source carrier;

a source, corresponding to the hole and arranged on the source carrier; the source connected to the printed circuit board and transmitting light into the backlight module from the hole.

Furthermore, a groove is further arranged on each of the two terminals of the source carrier and configured to fix the source carrier to the plastic frame.

Furthermore, the plurality of source carriers are connected to head to tail and integrated.

According to the present disclosure, a plastic frame of a backlight module configured to support the backlight module formed by combination of a backlight source is provided. The plastic frame comprises a first lateral wall, a second lateral wall, and a third lateral wall. The first lateral wall, the second lateral wall, and the third lateral wall are sequentially connected to the backlight source. The first lateral wall, the second lateral wall, the third lateral wall, and the backlight source are enclosed to form a rectangular frame.

Furthermore, a bump is arranged on terminals of the first lateral wall and terminals of the third lateral wall.

Furthermore, a light-block bar is arranged between the first lateral wall and the third lateral wall; the light-block bar adjoins the bump or covers the top of the bump.

Furthermore, the light-block bar, the first lateral wall, the second lateral wall, and the third lateral wall are formed as one piece.

According to the present disclosure, a backlight module including a plastic frame and a backlight source is provided. The plastic frame and the backlight source enclose to form a rectangular frame. A reflector is arranged on the bottom of the rectangular frame. A light guide plate and an optical film set are arranged in the rectangular frame. One side of the light guide plate corresponds to a light emitting surface of the backlight source.

The backlight source includes:

one or more strip-shaped source carrier, comprising a plurality of holes arranged on a light emitting surface; the source carrier and the plastic frame assembled and enclosed to form the rectangular frame;

a printed circuit board (PCB), arranged on the source carrier; and a light source, corresponding to the hole and arranged on the source carrier; the light source connected to the printed circuit board and configured to send a light into the light guide plate via the hole.

Furthermore, a connector is further arranged between the plastic frame and the source carrier and configured to fix the plastic frame and the source carrier.

Furthermore, the connector comprises a bump arranged on the plastic frame and a groove arranged on the source carrier and corresponding to the bump.

Furthermore, the backlight module comprises a light-block bar; the light-block bar is arranged on the plastic frame and corresponds to an area between the backlight source and the light guide plate; the light-block bar is configured to reduce lateral light leakage of the backlight source.

Furthermore, the light-block bar and the plastic frame are formed as one piece.

The beneficiary effects are as follows:

1. The conventional plastic frame and the backlight source is rearranged and reorganized. The conventional plastic frame is divided into two. A new plastic frame, i.e. "missing lateral wall," is obtained. The function of the missing lateral wall is executed by the backlight source.

The combination of the plastic frame and the backlight source proposed by the present disclosure realizes the respective functions of the conventional plastic frame and the conventional backlight source. The rearranged and reorganized structure is a simplified structure, which is good for reducing the production costs.

2. It is not necessary to mount the LED source on a flexible printed circuit (FPC) so the linearity of the light source is better.

3. The conventional assembly of the backlight source is simplified. It is not necessary to assemble the backlight source on the plastic frame via a double-sided glue. In other words, it is easier and quicker to dismantle and replace the components.

4. The black light-block bar of the plastic frame is formed via double injection, which facilitates absorption of the light. Therefore, the possibility of deformation of the plastic frame is reduced. The leakage of the light is reduced as well.

5. Since the density of the LED source is higher, and the heat dissipation potential is better, the present disclosure can be adopted by the highly bright backlight module.

6. Owing to the simplified plastic frame and backlight source, the bezel of the display can be narrower and smaller to satisfy the demands for the display with a narrow bezel.

BRIEF DESCRIPTION OF THE DRAWINGS

These and other features, aspects and advantages of the present disclosure will become understood with reference to the following description, appended claims and accompanying figures.

DETAILED DESCRIPTION OF THE PREFERRED EMBODIMENTS

For better understanding embodiments of the present invention, the following detailed description taken in conjunction with the accompanying drawings is provided.

Apparently, the accompanying drawings are merely for some of the embodiments of the present invention. Any ordinarily skilled person in the technical field of the present invention could still obtain other accompanying drawings without use laborious invention based on the present accompanying drawings.

A new structure of a backlight module and the backlight source of the backlight module are proposed to simplify the assembly of a plastic frame and a light-emitting diode (LED) strip and to facilitate dismantle.

Figure 1:
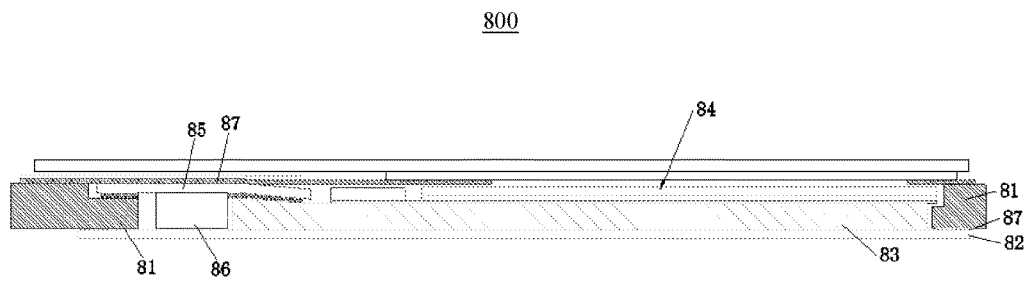
FIG. 1 illustrates a schematic diagram of a conventional backlight module.
Figure 2:
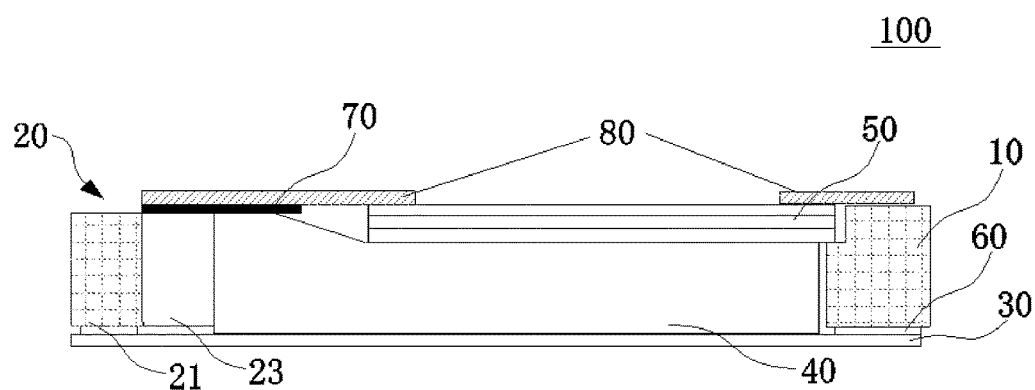
FIG. 2 illustrates a schematic diagram of a backlight module according to an embodiment of the present disclosure.
Figure 3:
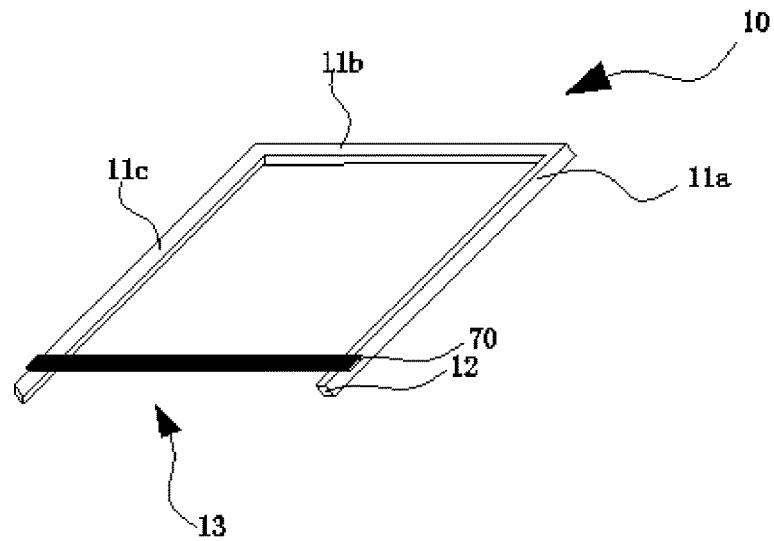
FIG. 3 illustrates a schematic diagram of a plastic frame according to an embodiment of the present disclosure.

Please refer to FIG. 2 and FIG. 3. A backlight module 100 includes a plastic frame 10 and a backlight source 20. The plastic frame 10 and the backlight source 20 are enclosed to form a rectangular frame. A reflector 30 is attached to the bottom of the plastic frame 10 and the backlight source 20 via a double-sided glue 60. A light guide plate 40 and an optical film set 50 are arranged in the rectangular frame sequentially. One side of the light guide plate 40 corresponds to a light emitting surface of the backlight source 20. The backlight module 100 further includes a light-block bar 70 hung up on the backlight source 20 and the light guide plate 40 correspondingly. A light-block glue 80 is arranged on the surface of the optical film set 50 and the light-block bar 70.

As FIG. 3 shows, the plastic frame 10 proposed by this embodiment and the hollow rectangular structure of the plastic frame in the related art are different. In the present disclosure, the plastic frame 10 is formed by a first lateral wall 11a, a second lateral wall 11b, and a third lateral wall 11c. The first lateral wall 11a, the second lateral wall 11b, and the third lateral wall 11c are sequentially connected in the shape of a "U" with an opening. A free terminal 12 is arranged on the first lateral wall 11a and the third lateral wall 11c. An area called "missing lateral wall" of the plastic frame 10 is a source replacement portion 13 and is used to be in substitution for the matched backlight source 20. That is, the plastic frame 10 is actually one part of the conventional plastic frame and fails to support independently as the conventional plastic frame does. The plastic frame 10 and the backlight source 20 are assembled to execute the support function as the conventional plastic frame does.

Further, a black light-block bar 70 is inserted between the first lateral wall 11a and the third lateral wall 11c on the plastic frame 10. The light-block bar 70 corresponds to an upper side of the light emitting surface of the backlight source 20 and makes the light generated by the backlight source 20 enter the light guide plate as far as possible, that is less light leakage. In the practical production process, the plastic frame 10 is obtained through double injection. The light-block bar 70 and the plastic frame 10 are formed as one piece, which enforces the rigidity of the plastic frame 10 and prevents the plastic frame 10 from deformation as far as possible.

Figure 4:
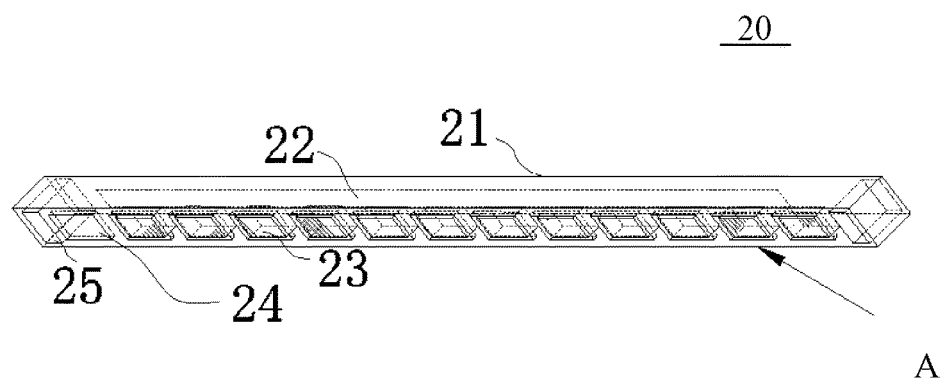
FIG. 4 illustrates a schematic diagram of a backlight source according to an embodiment of the present disclosure.

Refer to FIG. 4 as well. The backlight source 20 includes a source carrier 21, a printed circuit board (PCB) 22, and a light source 23.

Figure 5:
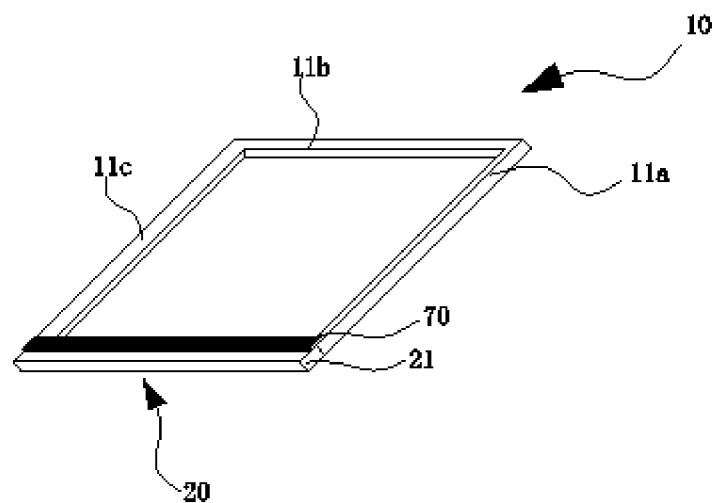
FIG. 5 illustrates a schematic diagram of an assembly of the plastic frame and the backlight source according to an embodiment of the present disclosure.

The source carrier 21 is strip-shaped and is used to supply the light source 23 and the PCB 22 with supportive and accommodating. Specifically, the source carrier 21 includes a plurality of holes 24 on a light emitting surface A of the light source sequentially. The source carrier 21 and the source replacement portion 13 of the plastic frame 10 may be assembled and encloses a rectangular frame (as FIG. 5 shows) with the plastic frame 10. In other words, the source carrier 21 is a "missing lateral wall" of the plastic frame 10. The assembly of the source carrier 21 and the plastic frame 10 realizes the functions of the conventional plastic frame.

The PCB 22 is arranged on the source carrier 21 and used to supply the light source 23 with power.

The light source 23 corresponds to the hole 24 and is arranged on the source carrier 21. The light source 23 is electrically connected to the PCB 22 to transmit the light into the light guide plate 40 through the hole 24.

Further, the source carrier 21 includes phosphor (not shown).

With the components, an entire "LED illumination strip" (i.e. the backlight source 20) is formed in the source carrier 21. In the backlight source 20, a plurality of light sources (LEDs) 23 undergo the process on the strip-shaped source carrier 21. The PCB 22 is electrically connected to the plurality of light sources 23, and then the PCB 22 and the plurality of light sources 23 are arranged in any spare space of the source carrier 21. In addition, to enhance production efficiency, a long strip of a plurality of LEDs are processed at the same time in the manufacturing process, and then the strip of LEDs are cut into independent light sources with different lengths on demands. The "LED illumination strips" with different lengths are processed and cut into independent light sources with proper sizes. The light sources with proper sizes work with the plastic frames with proper sizes, which functions as one lateral wall of the original plastic frame does. If the design of the backlight source proposed by the present disclosure is adopted, it is not necessary to mount the LED on the PCB and then to attach the mounted LED onto the plastic frame. So both of labor power and resources in the assembly process are greatly saved.

Figure 6:
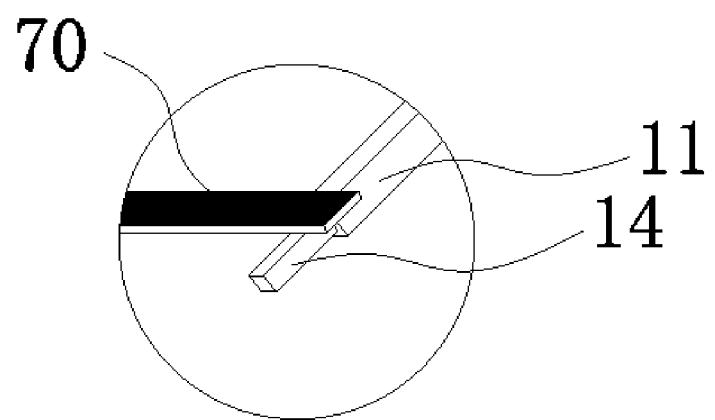
FIG. 6 illustrates a schematic diagram of a plastic frame according to another embodiment of the present disclosure.

There are a variety of connections for the plastic frame 10 and the source carrier 21. For example, an adhesive as a connector connects the plastic frame 10 to the source carrier 21, or other structures as a connector connects the plastic frame 10 to the source carrier 21. Please refer to FIG. 4, FIG. 5, and FIG. 6. A connector in this embodiment is a groove and a bump, and the groove and the bump are matched. For example, a bump 14 is arranged on a free terminal of a first lateral wall 11a of the plastic frame 10 and a free terminal of a third lateral wall 11c of the plastic frame 10. A groove 25 is arranged on each of the two terminals of the source carrier 21. The groove 25 works with the bump 14 transitionally. When the plastic frame 10 needs to be combined with the source carrier 21, the grooves 25 match the bumps 14 exactly. After the bumps 14 are inserted into the grooves 25, the source carrier 21 is fixed on the plastic frame 10, as FIG. 6 shows.

Figure 7:
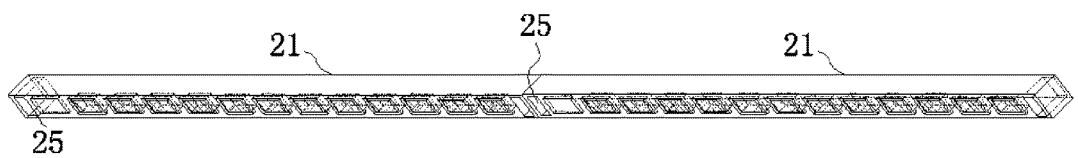
FIG. 7 illustrates a schematic diagram of an assembly of the backlight source according to an embodiment of the present disclosure.

For some products with a large display screen, the backlight module needs to be assembled to be longer. So two or more than two source carriers 21 are sequentially connected in series to head to tail to form a longer support structure of the backlight source 20. In preparation process of the source carrier 21, the plurality of source carriers 21 may be integrated. For example, the plurality of source carriers 21 are predetermined to be connected via the grooves, to be connected in series to head to tail, and to be formed to be an entirety via double injection. In practical use, the plurality of source carriers 21 correspond to the size of the display device and are put in proper locations. For example, any two adjoining grooves are cut from the middle. One single source carrier 21 or the combination of two or more than two source carriers 21 (as FIG. 7 shows) are divided so that the length of the backlight source 20 can increase or decrease freely. Since the plurality of backlight sources 20 are connected in series, the brightness of the backlight module is enhanced. More importantly, the backlight source, the light guide plate, the optical film set, and other components are assembled to be an entire backlight module in the plastic frame.

The structure and function of the conventional plastic frame and backlight source is rearranged and reorganized in the present disclosure. After rearrangement and reorganization, the production process of the backlight source is simplified. Also, the structure of the conventional plastic frame and backlight source is simplified as well. In other words, the time and the costs of the production process of the backlight source and the assembly of the backlight source and the plastic frame are greatly reduced, which implies that economic benefits increase. Besides, with the simplification of the structure of the plastic frame and the backlight source, the bezel of the LCD panel can be narrowed, which satisfies the demands for a modern LCD product.

Although the present invention has been explained by the embodiments shown in the drawings described above, it should be understood to the ordinary skilled person in the art that the invention is not limited to the embodiments, but rather various changes or modifications thereof are possible without departing from the spirit of the invention. Accordingly, the scope of the invention shall be determined only by the appended claims and their equivalents.

What is claimed is:

1. A plastic frame of a backlight module, configured to support the backlight module formed by combination of a backlight source, wherein the plastic frame comprises a first lateral wall, a second lateral wall, and a third lateral wall; the first lateral wall, the second lateral wall, and the third lateral wall are sequentially connected to the backlight source; the first lateral wall, the second lateral wall, the third lateral wall, and the backlight source are enclosed to form a rectangular frame, wherein a bump is arranged on terminals of the first lateral wall and terminals of the third lateral wall, wherein a light-block bar is arranged on and contacts the first lateral wall and the third lateral wall; the light-block bar adjoins the bump or covers the top of the bump.

2. The plastic frame of claim 1, wherein the light-block bar, the first lateral wall, the second lateral wall, and the third lateral wall are formed as one piece.

3. A backlight module, comprising a plastic frame and a backlight source; the plastic frame and the backlight source enclosed to form a rectangular frame; a reflector arranged on the bottom of the rectangular frame; a light guide plate and an optical film set arranged in the rectangular frame; one side of the light guide plate corresponding to a light emitting surface of the backlight source;

the backlight source comprising:
one or more strip-shaped source carrier, comprising a plurality of holes arranged on a light emitting surface; the source carrier and the plastic frame assembled and enclosed to form the rectangular frame; and
a printed circuit board (PCB), arranged on the source carrier;
a light source, corresponding to the hole and arranged on the source carrier; the light source connected to the printed circuit board and configured to send a light into the light guide plate via the hole;
wherein the plastic frame comprises a first lateral wall, a second lateral wall, and a third lateral wall;
wherein a bump is arranged on terminals of the first lateral wall and terminals of the third lateral wall;
wherein the backlight module comprises a light-block bar; the light-block bar is arranged on the plastic frame and corresponds to an area between the backlight source and the light guide plate; the light-block bar is configured to reduce lateral light leakage of the backlight source; and wherein the light-block bar is arranged on and contacts the first lateral wall and the third lateral wall; the light-block bar adjoins the bump or covers the top of the bump.

4. The backlight module of claim 3, wherein a connector is further arranged between the plastic frame and the source carrier and configured to fix the plastic frame and the source carrier.

5. The backlight module of claim 4, wherein the connector comprises a bump arranged on the plastic frame and a groove arranged on the source carrier and corresponding to the bump.

6. The backlight module of claim 3, wherein the light-block bar and the plastic frame are formed as one piece.

* * * * *